United States Patent
Diss et al.

(10) Patent No.: US 10,400,367 B2
(45) Date of Patent: Sep. 3, 2019

(54) PART MADE FROM OXIDE/OXIDE COMPOSITE MATERIAL FOR 3-D REINFORCING AND METHOD FOR MANUFACTURE OF SAME

(71) Applicant: HERAKLES, Le Haillan (FR)

(72) Inventors: Pascal Diss, Le Haillan (FR); Eric Bouillon, Le Haillan (FR); Eric Lavasserie, Begles (FR)

(73) Assignee: SAFRAN CERAMICS, Le Haillan (FR)

( * ) Notice: Subject to any disclaimer, the term of this patent is extended or adjusted under 35 U.S.C. 154(b) by 262 days.

(21) Appl. No.: 15/120,969

(22) PCT Filed: Feb. 19, 2015

(86) PCT No.: PCT/FR2015/050405
§ 371 (c)(1),
(2) Date: Aug. 23, 2016

(87) PCT Pub. No.: WO2015/124872
PCT Pub. Date: Aug. 27, 2015

(65) Prior Publication Data
US 2016/0362822 A1    Dec. 15, 2016

(30) Foreign Application Priority Data
Feb. 24, 2014  (FR) ..................................... 14 51447

(51) Int. Cl.
*D03D 11/00* (2006.01)
*D03D 25/00* (2006.01)
(Continued)

(52) U.S. Cl.
CPC ............. *D03D 25/005* (2013.01); *B28B 7/46* (2013.01); *B28B 13/021* (2013.01); *B28B 23/0006* (2013.01); *C04B 35/6224* (2013.01); *C04B 35/62236* (2013.01); *C04B 35/62245* (2013.01); *C04B 35/64* (2013.01); *C04B 35/803* (2013.01);
(Continued)

(58) Field of Classification Search
None
See application file for complete search history.

(56) References Cited

FOREIGN PATENT DOCUMENTS

EP    0 130 105 A1    1/1985
FR    2 526 785 A1    11/1983
(Continued)

OTHER PUBLICATIONS

International Search Report as issued in International Patent Application No. PCT/FR2015/050405, dated Mar. 30, 2015.

*Primary Examiner* — Arti Singh-Pandey
(74) *Attorney, Agent, or Firm* — Pillsbury Winthrop Shaw Pittman LLP

(57) ABSTRACT

A part made of oxide/oxide composite material includes fiber reinforcement constituted by a plurality of warp yarn layers and of weft yarn layers interlinked by three-dimensional weaving, with the spaces present between the reinforcing yarns being filled with a refractory oxide matrix. The fiber reinforcement presents a weave selected from the following weaves: interlock; multi-plain; multi-satin; and multi-serge, with warp and weft thread counts lying in the range 4 yarns/cm to 20 yarns/cm. The fiber reinforcement also presents a fiber volume fraction lying in the range 40% to 51%.

9 Claims, 4 Drawing Sheets

(51) Int. Cl.
    *C04B 35/80*     (2006.01)
    *C04B 35/622*     (2006.01)
    *C04B 35/64*     (2006.01)
    *B28B 7/46*     (2006.01)
    *B28B 13/02*     (2006.01)
    *B28B 23/00*     (2006.01)

(52) U.S. Cl.
    CPC ...... *D03D 11/00* (2013.01); *C04B 2235/3217* (2013.01); *C04B 2235/3418* (2013.01); *C04B 2235/3463* (2013.01); *C04B 2235/447* (2013.01); *C04B 2235/522* (2013.01); *C04B 2235/5224* (2013.01); *C04B 2235/5228* (2013.01); *C04B 2235/5232* (2013.01); *C04B 2235/5252* (2013.01); *C04B 2235/616* (2013.01); *C04B 2235/77* (2013.01); *C04B 2235/96* (2013.01); *D10B 2505/02* (2013.01)

(56) References Cited

FOREIGN PATENT DOCUMENTS

| | | | |
|---|---|---|---|
| FR | 2 702 475 A1 | 9/1994 | |
| FR | 2902802 A1 * | 12/2007 | ............... B32B 5/08 |
| FR | 2 953 885 A1 | 6/2011 | |

\* cited by examiner

PART MADE FROM OXIDE/OXIDE COMPOSITE MATERIAL FOR 3-D REINFORCING AND METHOD FOR MANUFACTURE OF SAME

CROSS-REFERENCE TO RELATED APPLICATIONS

This is the U.S. National Stage of PCT/FR2015/050405, filed Feb. 19, 2015, which in turn claims priority to French Patent Application No. 1451447, filed Feb. 24, 2014, the entire contents of all applications are incorporated herein by reference in their entireties.

BACKGROUND OF THE INVENTION

The present invention relates to a method of fabricating a part made of composite material of oxide/oxide type, i.e. comprising fiber reinforcement made of refractory oxide fibers that is densified by a matrix likewise made of refractory oxide.

The great majority of oxide/oxide composite material parts are prepared in the following two manners:

making a fiber texture by stacking two-dimensional plies of woven oxide fiber fabric and impregnating the texture with a suspension containing oxide fillers, the filled preform then being subjected to sintering; or making a fiber texture by winding oxide fiber yarns that have previously been immersed in a suspension containing oxide fillers, the filled preform then being subjected to sintering.

Nevertheless, the mechanical characteristics of oxide/oxide composite materials obtained by those methods of preparation remain limited in certain directions. In particular, those materials present low shear strength.

Making fiber textures obtained by three-dimensional weaving between continuous warp and weft yarns enables the mechanical strength of the material to be increased. Under such circumstances, it is possible to cause a filled suspension to penetrate into the fiber texture, which may be of thickness that reaches several tens of millimeters, depending on the intended application only by methods that make use of a pressure gradient, such as injection molding type methods known as resin transfer molding (RTM), or else submicrometer powder suction (SPS).

The volume fraction of fibers in oxide/oxide composite materials is one of the fundamental parameters to be taken into consideration for achieving the final mechanical properties of the material. That is why, the fiber texture needs to be compacted by using specific tooling while preparing an oxide/oxide composite material. During the step of drying in tooling, a network of cracks forms in the matrix present between the yarns. The network of cracks leads to the impregnated preform expanding during unmolding, thereby leading to a great reduction in the mechanical properties of the material in the final stage.

One known way of remedying that expansion consists in adding an organic binder, e.g. polyvinyl acetate (PVA), to the initial suspension, thereby contributing to the cohesion of the system after the preform has dried by preventing the above-described expansion phenomenon.

In order to obtain high mechanical characteristics in a single impregnation step, it is necessary to use a slip having a sufficient volume percentage of fillers. Under such circumstances, adding an organic binder modifies the behavior of the slip. Its behavior changes from being Newtonian behavior (viscosity independent of the flow speed) to a shear-thinning behavior (viscosity dependent on the flow speed). This phenomenon leads to the appearance of non-uniformity in the composition within the material when using preparation by means of the SPS technique.

More precisely, considering the material as a whole, poor control over the flow of the suspension inside the fiber texture leads to the appearance of a composition gradient (fiber/matrix ratio) across the thickness of the material. More locally within the material, pores of uncontrolled size and distribution form once the fillers have been stabilized by sintering.

OBJECT AND SUMMARY OF THE INVENTION

An object of the present invention is to remedy the above-mentioned drawbacks and to propose a solution that makes it possible to have parts made out of oxide/oxide composite material prepared using the SPS technique, in a single impregnation step and without requiring the use of an additional organic binder, the parts including reinforcement obtained by three-dimensional weaving and presenting mechanical properties that are improved compared with prior art parts.

To this end, the invention proposes a part made of oxide/oxide composite material comprising fiber reinforcement constituted by a plurality of warp yarn layers and of weft yarn layers interlinked by three-dimensional weaving, with the spaces present between the reinforcing yarns being filled with a refractory oxide matrix;

the part being characterized in that the fiber reinforcement presents a weave selected from the following weaves: interlock; multi-plain; multi-satin; and multi-serge; and warp and weft thread counts lying in the range 4 yarns per meter (yarns/cm) to 20 yarns/cm, and in that the fiber reinforcement presents a fiber volume fraction lying in the range 40% to 51%.

With fiber reinforcement presenting the above-described characteristics, and taking care to adjust the fiber volume fraction to the selected texture variant, the spaces present between the yarns of the reinforcement are of dimensions that are less than five times the maximum section of the yarns of the fiber reinforcement. By limiting the sizes of the spaces present between yarns in this way, the sizes of the blocks of matrix that are present in the material are limited so that each matrix block does not have any dimension that is greater than five times the maximum section of the reinforcing fibers. The Proprietor has observed that by limiting the size of matrix blocks in the oxide/oxide material in this way, it is possible to prevent cracks appearing therein. Consequently, the oxide/oxide composite material part presents improved mechanical properties.

In a particular aspect of the part of the invention, it presents, in monotonic traction, at ambient temperature, and in the warp direction:

a modulus of elasticity lying in the range 120 gigapascals (GPa) to 170 GPa;

a breaking deformation of not less than 0.35%; and a breaking stress greater than 250 megapascals (MPa).

The yarns of the fiber reinforcement may be made of fibers constituted by one or more of the following materials: alumina; mullite; silica; an aluminosilicate; and a borosilicate.

The material of the matrix may be selected from: alumina; mullite; silica; an aluminosilicate; and an aluminophosphate. The matrix may optionally be doped with one or more materials serving to add specific functions to the final material of the part.

The invention also provides a method of fabricating an oxide/oxide composite material part, the method comprising the following steps:

forming a fiber texture by three-dimensional weaving of refractory oxide yarns;

compacting the fiber texture;

placing on one side of the fiber texture a slip containing a submicrometer powder of refractory oxide particles;

establishing a pressure difference to force the slip to pass through the fiber texture;

filtering the liquid of the slip that has passed through the fiber texture so as to retain the powder of refractory oxide particles inside said texture;

drying the filled preform; and sintering the submicrometer powder of refractory oxide particles in order to form a refractory oxide matrix in the preform;

the method being characterized in that during the step of forming the fiber texture the yarns are woven with a weave selected from the following weaves: interlock; multi-plain; multi-satin; and multi-serge; with warp and weft thread counts lying in the range 4 yarns/cm to 20 yarns/cm, and in that, after the compacting step, said fiber reinforcement presents a fiber volume fraction lying in the range 40% to 51%.

This produces oxide/oxide composite material parts with 3D woven reinforcement that are entirely uniform throughout their volume and that do not include cracks or pores that might degrade the mechanical properties of the part.

The yarns of the preform may be yarns made of fibers constituted by one or more of the following materials: alumina; mullite; silica; an aluminosilicate; and a borosilicate.

The submicrometer particles may be made of a material selected from: alumina; mullite; silica; an aluminosilicate; and an aluminophosphate; optionally with additional fillers serving to add functions to the material of the part.

BRIEF DESCRIPTION OF THE DRAWINGS

Other characteristics and advantages of the invention appear from the following description of particular implementations of the invention, given as nonlimiting examples, and with reference to the accompanying drawings, in which.

DETAILED DESCRIPTION OF EMBODIMENTS

The method of fabricating a part out of oxide/oxide composite material in accordance with the present invention begins by making a fiber texture that is to form the reinforcement of the part.

Figure 8:
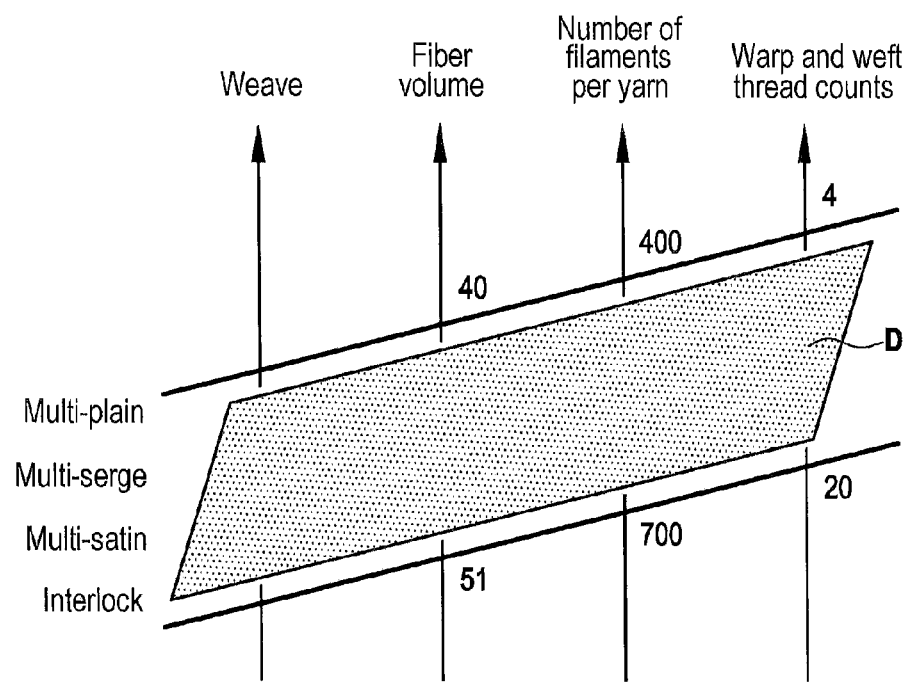
FIG. 8 is a diagram showing the design domain for the fiber texture of the invention.

In accordance with the invention, the fiber texture is made by three-dimensional weaving between a plurality of warp yarns and a plurality of weft yarns, the layers of warp yarns being interlinked by weft yarns using three-dimensional weaving corresponding to a weave selected from one of the following weaves: interlock; multi-plain; multi-satin; and multi-serge; and with warp and weft thread counts lying in the range 4 yarns/cm to 20 yarns/cm, the texture as obtained in this way then being contacted to present a fiber volume fraction lying in the range 40% to 51%, the yarns or fibers in the fiber texture each having a number of filaments lying in the range 400 filaments to 700 filaments. FIG. 8 shows the design domain D for the fiber texture according to the invention, the domain D defining the values that need to be presented by the parameters relating to the fiber texture of the invention.

These characteristics of the fiber texture make it possible to ensure that there are no spaces between the yarns presenting a dimension greater than five times the maximum section of the yarns. Thus, once the matrix has been formed within the texture, the blocks of matrix that are present between the yarns of the texture present dimensions that are all less than five times the maximum section of the yarns, thereby making it possible to prevent cracks appearing in the final material of the part.

The term "matrix block" is used herein to mean any continuous portion of matrix situated between two or more yarns. The term "dimension of a matrix block" is used herein to designate any length, width, depth, thickness, height, or indeed diameter of a matrix block, and in still more general manner any size that can be measured in a straight-line direction.

The term "thread count" is used herein to designate the number of yarns per unit length in the warp direction and in the weft direction.

The terms "three-dimensional weaving" and "3D weaving" are used herein to designate a weaving technique in which at least some of the warp yarns interlink weft yarns over a plurality of weft layers.

Throughout the specification below, and in all of the drawings, it is stated and shown by convention and for reasons of convenience that it is the warp yarns that are deflected from their paths in order to take hold of the weft yarns of one or more layers of weft yarns. Nevertheless, it is also possible for the roles to be interchanged between warp and weft, which must also be considered as being covered by the claims.

Figure 1:
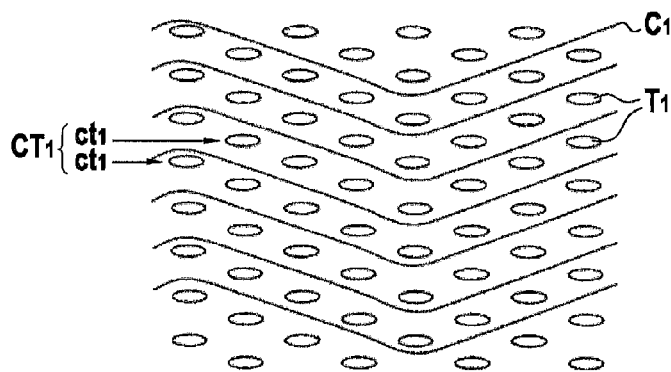
FIG. 1 shows a plane of a three-dimensional interlock weave in accordance with an embodiment of the fiber texture of the invention.

The term "interlock weave or fabric" is used herein to mean a 3D weave in which each layer of warp yarns interlinks a plurality of layers of weft yarns, with all of the yarns in the same warp column having the same movement in the weave plane. FIG. 1 is a view of eight planes of an interlock weave having seven layers of warp yarns $C_1$ and eight layers $CT_1$ of weft yarns $T_1$. In the interlock weave shown, a layer $CT_1$ of warp yarns $T_1$ is made up of two adjacent half-layers $ct_1$ that are offset from each other in the warp direction. There are thus 16 half-layers of weft yarns in a staggered configuration. Each warp yarn $C_1$ interlinks three half-layers of weft yarns. It would also be possible to adopt a weft arrangement that is not staggered, the weft yarns of two adjacent layers of weft yarns being aligned in the same columns.

By way of example, the fiber texture of the invention may be made by 3D weaving using an interlock weave as shown in FIG. 1 with warp and weft thread counts of 8 yarns/cm, 10 yarns/cm, and 12 yarns/cm, or with a warp thread count of 12 yarns/cm and a weft thread count of 5 yarns/cm.

Figure 2:
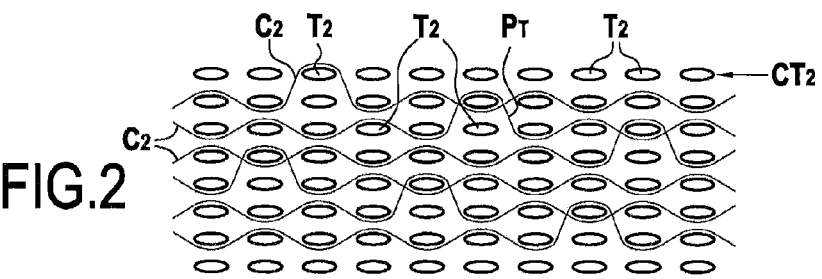
FIG. 2 shows a plane of a three-dimensional multi-plain weave in accordance with an embodiment of the fiber texture of the invention.

The term "multi-plain weave or fabric", is used herein to mean 3D weaving with a plurality of weft yarn layers in which the basic weave for each layer is equivalent to a conventional plain type weave, but with certain crosspoints of the weave that interlink the weft yarn layers. FIG. 2 shows a plane of multi-plain fabric in which the warp yarns $C_2$ are occasionally diverted from their paths in a conventional 2D plane weave associated with a layer $CT_2$ of weft yarns in order to take hold of a weft yarn $T_2$ of a neighbouring layer, thereby forming particular plain crosspoints $P_T$ interlinking two adjacent weft yarn layers. At a particular plain crosspoint $P_T$, the warp yarn the $C_2$ passes around two weft yarns $T_2$ situated in the same column in two adjacent weft layers $CT_2$.

By way of example, the fiber texture of the invention may be made by 3D weaving using a multi-plain weave as shown in FIG. 2 and with warp and weft thread counts of 20 yarns/cm.

Figure 3:
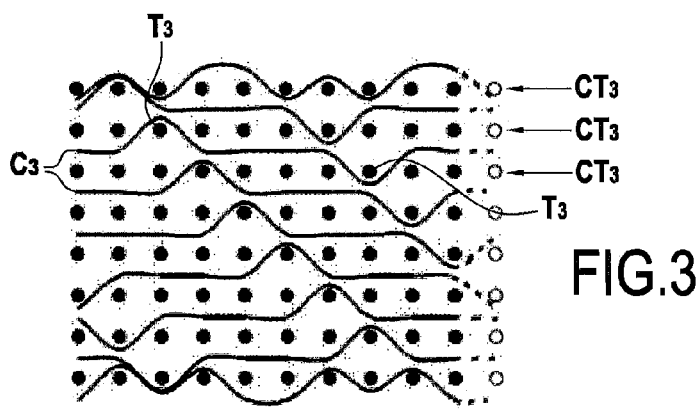
FIG. 3 shows a plane of a three-dimensional multi-satin weave in accordance with an embodiment of the fiber texture of the invention.

The term "multi-satin weave or fabric" is used herein to mean 3D weaving with a plurality of weft yarn layers in which the basic weave for each layer is equivalent to a conventional satin type weave, but with certain crosspoints of the weave that interlink the weft yarn layers. FIG. 3 shows a plane of a multi-satin fabric in which each warp yarn $C_3$, with the exception of warp yarns situated at the surface of the texture, is diverted in alternation in one direction and in the other in order to take hold of one weft yarn $T_3$ out of n of a first weft yarn layer $CT_3$ and one weft yarn $T_3$ out of n of a second weft yarn layer $CT_3$ adjacent to the first, where n is an integer number greater than two, thereby interlinking two layers.

By way of example, the fiber texture of the invention may be made by 3D weaving using a multi-satin weave as shown in FIG. 3 and with warp and weft thread counts of 10 yarns/cm.

Figure 4:
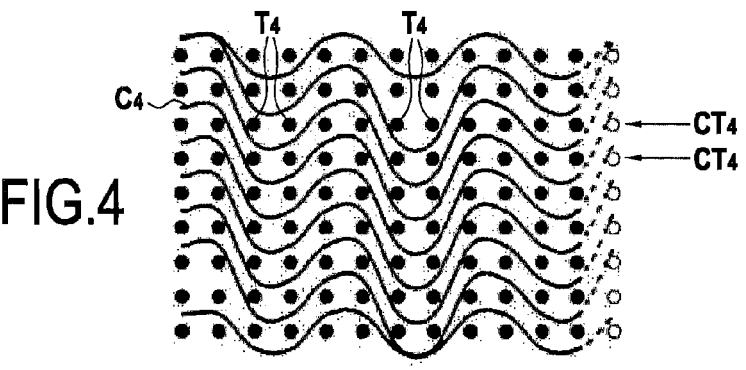
FIG. 4 shows a plane of a three-dimensional multi-serge weave in accordance with an embodiment of the fiber texture of the invention.

The term "multi-serge weave or fabric" is used herein to mean 3D weaving with a plurality of weft yarn layers in which the basic weave for each layer is equivalent to a conventional serge type weave, but with certain crosspoints of the weave that interlink the weft yarn layers. FIG. 4 shows a plane of a multi-serge fabric in which each warp yarn $C_4$, with the exception of warp yarns situated at the surface of the texture, is deflected so as to take hold of pairs of weft yarns $T_4$ of a weft yarn layer $CT_4$ or of a plurality of adjacent weft yarn layers $CT_4$.

By way of example, the fiber texture of the invention may be made by 3D weaving using a multi-serge weave as shown in FIG. 4 and with warp and weft thread counts of 8 yarns/cm.

The yarns used for weaving the fiber texture that is to form of the fiber reinforcement of the oxide/oxide composite material part may in particular be made of fibers constituted by any of the following materials: alumina; mullite; silica; an aluminosilicate; a borosilicate; or a mixture of a plurality of these materials.

Once the fiber texture has been made, it is compacted so as to adjust its fiber volume content to a value lying in the range 40% to 51%. Compacting is performed using tooling 100 that is for use in depositing refractory oxide particles within the fiber texture as described below in detail. The texture 10 is compacted by means of a grid 140 that is perforated so as to pass the slip that is used during the following operation. The grid 140 is held pressed against the fiber texture by holder means, e.g. by screws (not shown in FIG. 5), at a position in the tooling 100 that corresponds to the compacting thickness Ec that it is desired to apply to the texture. When there is no expansion of the fiber texture after unmolding (i.e. after impregnating the texture by the SPS technique and then drying it), the final thickness of the part is equal to the compacting thickness Ec.

The fiber volume fraction corresponds to the fraction of the total volume of the texture that is occupied by fibers within that total volume of the texture that is made. By way of example, with a fiber texture presenting the shape of a plane plate, the following parameters are used for calculating the fiber volume fraction:

the length L of the texture;
the width l of the texture;
the thickness $\underline{e}$ of the texture
the density $\underline{d}$ of the fibers; and
the weight per unit area Ms of the texture.

Specifically, the fiber volume fraction Tvf is equal to the fiber volume Vf divided by the total volume of the texture. The fiber volume Vf used is equal to the weight of the fibers used, i.e. Ms·L·l, Divided by the density $\underline{d}$ of the fibers, i.e.: Vf=Ms·L·l/d.

Since the total volume of the fiber structure in the form of a plate is equal to L·l·e, the fiber volume fraction Tvf is calculated using the following formula:

$$Tvf=Ms/(e.d) \quad (1)$$

Consequently, when it is desired to obtain a fiber texture presenting a fiber volume fraction with a value lying in the range 40% to 51%, the compacting thickness of the fiber texture is adjusted so that, after compacting, it presents a thickness $\underline{e}$ that makes it possible to obtain a fiber volume fraction lying in the range 40% to 51%, the compacting thickness being determined as a function of the weight per unit area Ms of the texture and of the fiber density, as specified by formula (1).

Figure 5:
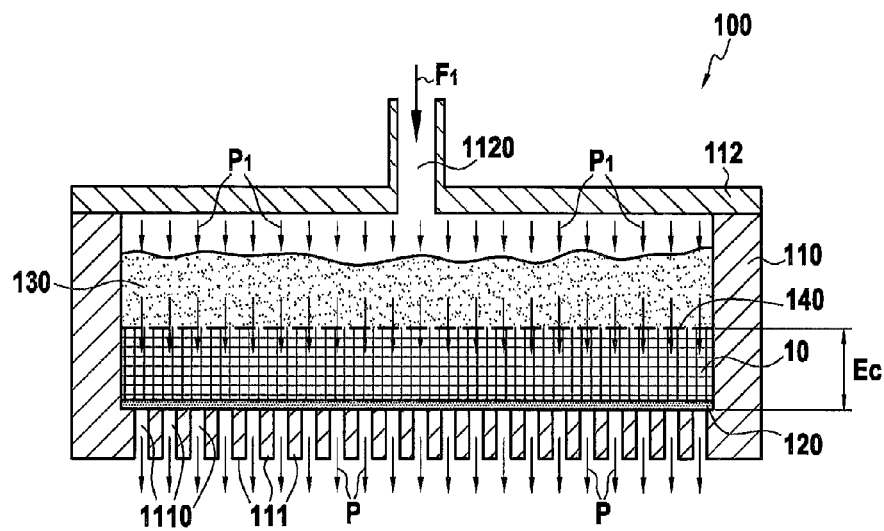
FIG. 5 is a diagrammatic view showing the infiltration of a fiber texture with refractory oxide particles by means of the SPS technique.

Particles of refractory oxide are then deposited within the fiber texture using the well-known technique of submicrometer powder suction (SPS). For this purpose, and as shown in FIG. 5, a fiber texture 10 made using one of the above-described 3D weaves, is placed in an enclosure 110 of tooling 100. A filter 120 is previously interposed between the bottom 111 of the enclosure 110 and the fiber texture 10, the bottom 111 including openings 1110. After placing the texture 10 in the enclosure 110, a slip 130 for forming a refractory oxide matrix in the texture is deposited on the top face of the fiber texture 10, i.e. the face of the texture that is opposite from its face facing the filter 120. The slip 130 corresponds to a suspension containing a submicrometer powder of refractory oxide particles. By way of example, the slip 130 may correspond to an aqueous suspension constituted by alumina powder having a mean particle size (D50) lying in the range 0.1 micrometers (μm) to 0.3 μm with a volume fraction lying in the range 27% to 42%, the suspension being acidified with nitric acid (pH lying in the range 1.5 to 4). In addition to alumina, the refractory oxide particles constituting the submicrometer powder could equally well be made of a material selected from mullite, silica, an aluminosilicate, and an aluminophosphate. The refractory oxide particles may also be mixed with particles of zirconium, rare earth oxides, or any other filler enabling specific functions to be added to the final material (carbon black, graphite, silicon carbide, etc.).

After closing the enclosure 110 with a cover 112, a gas stream $F_1$ made up of compressed air or nitrogen is introduced into the enclosure 110 via a duct 1120. The stream $F_1$ serves to apply a pressure $P_1$ that forces the slip 130 to penetrate into the texture 10. In combination with inserting the stream $F_1$, pumping P, e.g. using a primary vacuum pump (not shown in FIG. 5), is performed from the outside of the bottom 111 of the enclosure 110 through the openings 1110 so as to force the slip 130 to migrate through the texture 10. The filter 120 is calibrated to retain the refractory oxide particles that are present in the slip while the liquid of the slip is discharged via the openings 1110. The refractory oxide particles thus become progressively deposited by sedimentation in the texture.

This produces a fiber preform filled with refractory oxide particles, in this example alumina particles of the above-described type. The preform is then dried at a temperature lying in the range 35° C. to 95° C., and is then subjected to sintering heat treatment under air at a temperature lying in the range 1000° C. to 1200° C. in order to sinter the refractory oxide particles together, thereby forming a refractory oxide matrix in the preform. This produces a part made of oxide/oxide composite material having fiber reinforcement obtained by 3D weaving and not including cracks in the blocks of matrix present between the reinforcing yarns.

Figure 6:
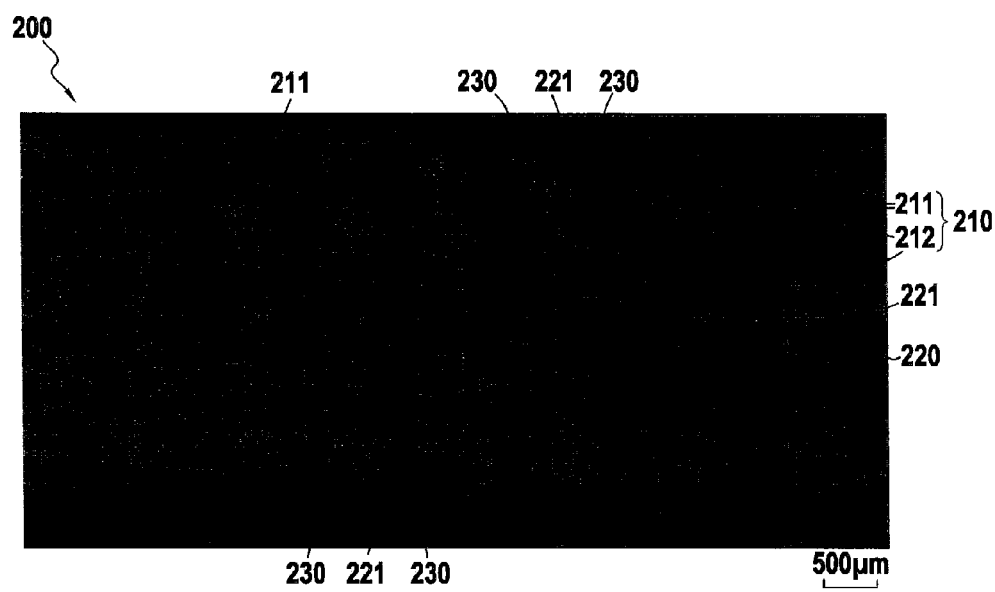
FIG. 6 is a micro-graph of a section of a part made of oxide/oxide type material as fabricated in the prior art.

FIG. 6 is a micro-graph of a section of a part 200 made of prior art oxide/oxide composite material, specifically in this example alumina fiber reinforcement densified by an alumina matrix with the fiber reinforcement 210 being formed by 3D weaving between weft yarn layers 211 and warp yarn layers 212 with an interlock weave, with warp and weft thread counts of 8 yarns/cm, and with a fiber volume fraction of 38%. The part 200 was fabricated in the same manner as that described above, i.e. by the SPS technique followed by drying and sintering of the filled preform. As can be seen in FIG. 6, the weave and the thread count defined for the fiber reinforcement 210 lead to blocks 221 of matrix 220 being formed in the material that present a dimension in at least one direction that is greater than five times the maximum section of the reinforcing yarns, in this example the section of a weft yarn 211. As can be seen in FIG. 6, since the size of the matrix blocks is not limited to less than five times the maximum section, cracks 230 have formed in the material. The presence of cracks 230, some of which even pass through the reinforcing yarns, significantly degrades the mechanical properties of the part 200.

Figure 7A:
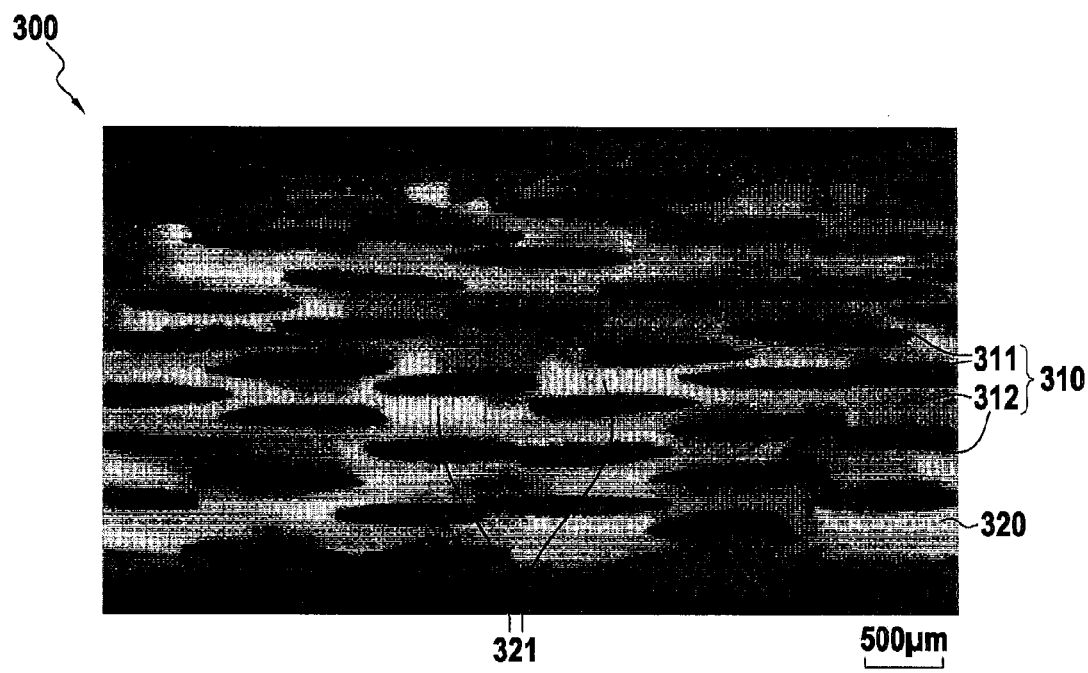
FIGS. 7A, 7B, and 7C are micro-graphs of a part made of oxide/oxide composite material in accordance with the invention.
Figure 7B:
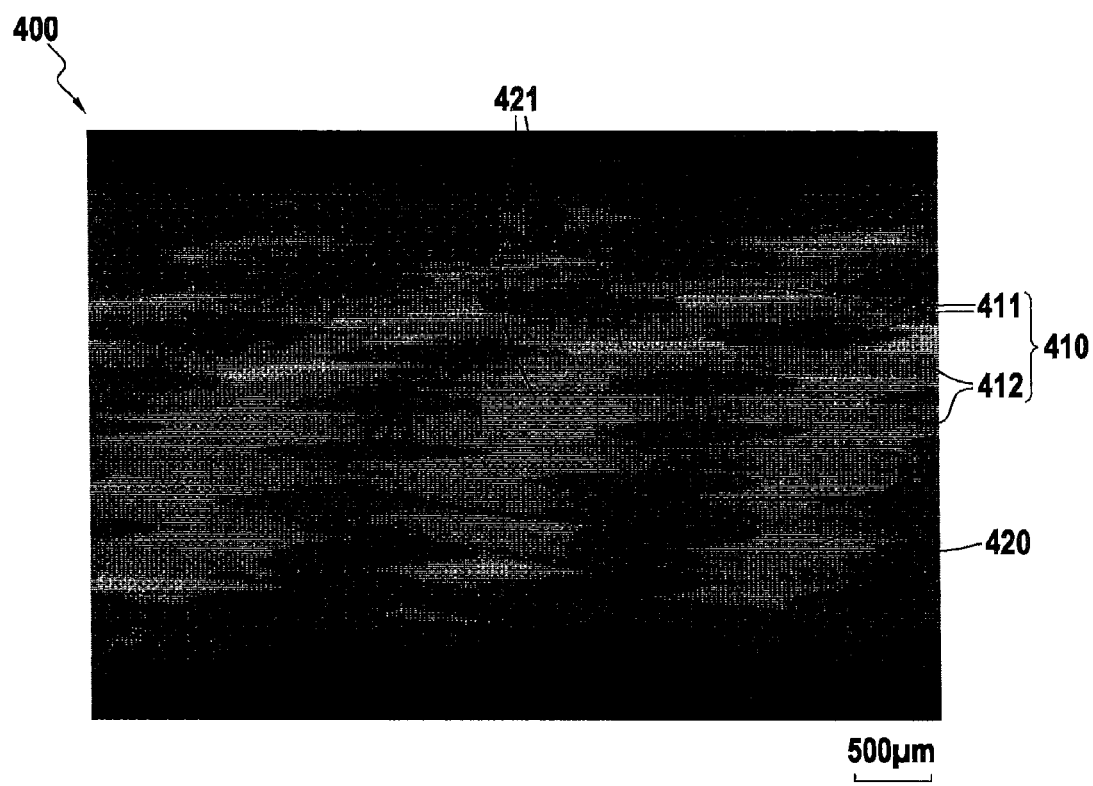
Figure 7C:
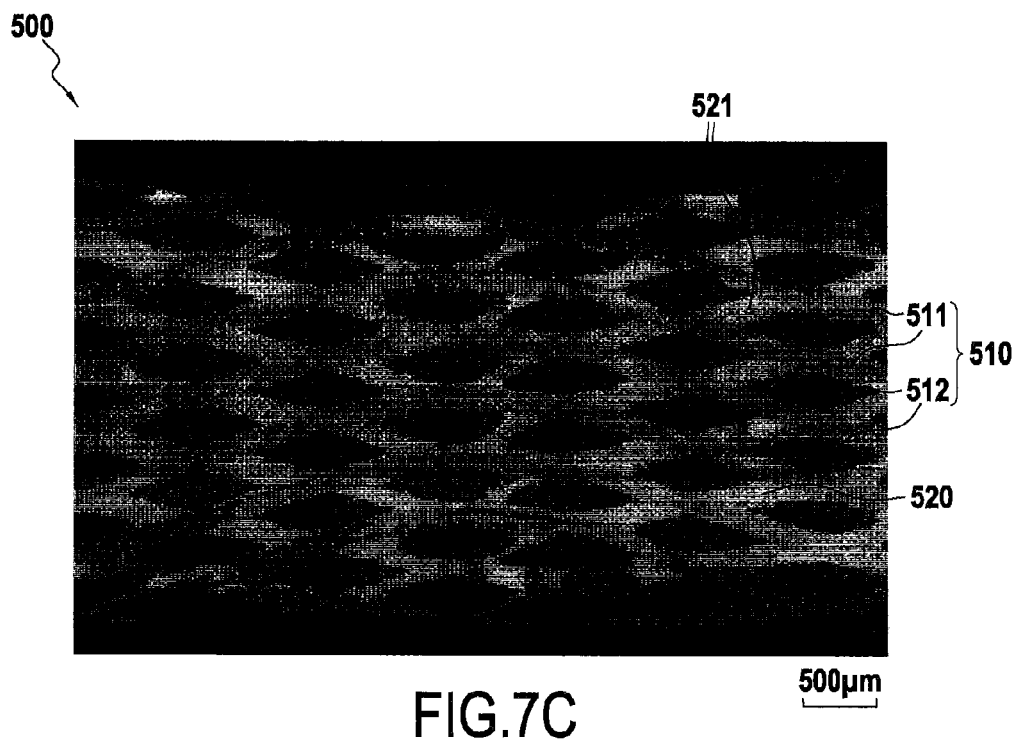

FIGS. 7A, 7B, and 7C are micro-graphs of a section in the warp direction (the long direction of the micro-graphs corresponds to the warp direction, and the high direction of the micro-graphs corresponds to the z direction) respectively of parts 300, 400, and 500 each made out of oxide/oxide composite material of the invention, namely in this example alumina fiber reinforcement densified by an alumina matrix.

In FIG. 7A, the fiber reinforcement 310 of the part 300 in this example was formed by 3D weaving between weft yarn layers 311 and warp yarn layers 312 using a multi-satin weave presenting warp and weft thread counts of 10 yarns/cm and a fiber volume fraction of 43.4%.

In FIG. 7B, the fiber reinforcement 410 of the part 400 in this example was formed by 3D weaving between weft yarn layers 411 and warp yarn layers 412 using an interlock weave presenting a warp thread count of 12 yarns/cm, a weft thread count of 5 yarns/cm, and a fiber volume fraction of 44.8%.

In FIG. 7C, the fiber reinforcement 510 of the part 500 in this example was formed by 3D weaving between weft yarn layers 511 and warp yarn layers 512 using an interlock weave presenting warp and weft thread counts of 12 yarns/cm, and a fiber volume fraction of 43.5%.

The parts 300, 400, and 500 were fabricated in the same manner as that described above, i.e. by the SPS technique followed by drying and sintering of the filled preform.

The weaves, the thread counts, and the fiber volume fractions as defined for the fiber reinforcements 310, 410, and 510 led to respective blocks 321, 421, and 521 of matrix 320, 420, and 520 being formed in the material that present dimensions in all directions that are less than five times the maximum section of the reinforcing yarns. As can be seen in FIGS. 7A, 7B, and 7C, since the matrix blocks are limited in size to less than five times the maximum section of the reinforcing yarns, no cracks are present in the material. Consequently, the parts 300, 400, and 500 present mechanical properties that are much superior to the properties of the part 200.

The table below gives the values obtained in terms of weight per unit area Ms, plate thickness $e$, density $d$ (alumina fiber), and fiber volume fraction Tvf for the parts of FIGS. 6, 7A, 7B, and 7C.

| Part | Texture | Ms (g/m$_2$) | e (mm) | d | TVf |
|---|---|---|---|---|---|
| Part 200 (FIG. 6) | 8/8 interlock | 6667 | 4.5 | 3.9 | 38 |
| Part 300 (FIG. 7A) | 10/10 multi-satin | 5420 | 3.2 | 3.9 | 43.4 |
| Part 400 (FIG. 7B) | 12/5 interlock | 5420 | 3.1 | 3.9 | 44.8 |
| Part 500 (FIG. 7C) | 12/12 interlock | 5770 | 3.4 | 3.9 | 43.5 |

It can be seen that the part 200 a FIG. 6 is the only part that presents a fiber volume fraction that does not lie in the range 40% to 51%. It can also be seen that the part 200 is the only part that has cracks in its material as a result of the presence of matrix blocks presenting a dimension in at least one direction that is more than five times the maximum section of the reinforcing yarns.

The method of the present invention enables oxide/oxide composite material parts to be fabricated from a three-dimensionally woven fiber texture and by using the SPS technique, which parts are thoroughly uniform throughout their volume and do not have cracks or pores. These parts in accordance with the invention present the following mechanical properties, measured in monotonic traction, at ambient temperature, and in the warp direction:

modulus of elasticity lying in the range 120 GPa to 170 GPa;

breaking deformation of not less than 0.35%; and breaking stress greater than 250 MPa.

Although the 3D woven fiber reinforcement yarns of the oxide/oxide material of a part of the invention may be covered in an interphase, the method of the invention makes it possible to make oxide/oxide composite parts with 3D woven fiber reinforcement without interphase on the yarns, and naturally without cracks in the material.

The invention claimed is:

1. A part made of oxide/oxide composite material comprising fiber reinforcement constituted by a plurality of warp yarn layers and of weft yarn layers interlinked by three-dimensional weaving, with the spaces present between the reinforcing yarns being filled with a refractory oxide matrix;

wherein the fiber reinforcement presents a weave selected from the following weaves: interlock; multi-plain; multi-satin; and multi-serge; and warp and weft thread counts lying in the range 4 yarns/cm to 20 yarns/cm, and wherein the fiber reinforcement presents a fiber volume fraction lying in the range 40% to 51%, and wherein spaces present between the yarns of the fiber reinforcement are of dimensions that are less than five times a maximum section of the yarns of the fiber reinforcement.

2. A part according to claim 1, wherein the part presents, in monotonic traction, at ambient temperature, and in the warp direction:
- a modulus of elasticity lying in the range 120 GPa to 170 GPa;
- a breaking deformation of not less than 0.35%; and
- a breaking stress greater than 250 MPa.

3. A part according to claim 1, wherein the yarns of the fiber reinforcement are made of fibers constituted by one or more of the following materials: alumina; mullite; silica; an aluminosilicate; and a borosilicate.

4. A part according to claim 1, wherein the material of the matrix is selected from: alumina; mullite; silica; an aluminosilicate; and an aluminophosphate.

5. A method of fabricating an oxide/oxide composite material part, the method comprising the following steps:
- forming a fiber texture by three-dimensional weaving of refractory oxide yarns;
- compacting said fiber texture;
- placing on one side of the fiber texture a slip containing a submicrometer powder of refractory oxide particles;
- establishing a pressure difference to force the slip to pass through the fiber texture;
- filtering a liquid of the slip that has passed through the fiber texture so as to retain the powder of refractory oxide particles inside said texture and to form a filled preform;
- drying the filled preform; and
- sintering the submicrometer powder of refractory oxide particles in order to form a refractory oxide matrix in the preform;

wherein during the step of forming the fiber texture the yarns are woven with a weave selected from the following weaves: interlock; multi-plain; multi-satin; and multi-serge; with warp and weft thread counts lying in the range 4 yarns/cm to 20 yarns/cm, and in that, after the compacting step, said fiber reinforcement presents a fiber volume fraction lying in the range 40% to 51%, such that spaces present between the yarns of the fiber reinforcement are of dimensions that are less than five times a maximum section of the yarns of the fiber reinforcement.

6. A method according to claim 5, wherein the yarns of the preform are made of fibers constituted by one or more of the following materials: alumina; mullite; silica; an aluminosilicate; and a borosilicate.

7. A method according to claim 5, wherein the submicrometer particles are made of a material selected from: alumina; mullite; silica; an aluminosilicate; and an aluminophosphate.

8. A method according to claim 5, wherein the yarns of the fiber reinforcement comprise continuous fibers.

9. A part according to claim 1, wherein the yarns of the fiber reinforcement comprise continous fibers.

* * * * *